US012326188B2

(12) United States Patent
Yamamoto et al.

(10) Patent No.: US 12,326,188 B2
(45) Date of Patent: Jun. 10, 2025

(54) SLIDING SURFACE SEALING STRUCTURE, GEAR BOX, AND MOTOR UNIT

(71) Applicant: MABUCHI MOTOR CO., LTD., Chiba (JP)

(72) Inventors: Kazuyuki Yamamoto, Chiba (JP); Takashi Tai, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/838,234

(22) PCT Filed: Aug. 25, 2023

(86) PCT No.: PCT/JP2023/030716
§ 371 (c)(1),
(2) Date: Aug. 14, 2024

(87) PCT Pub. No.: WO2025/046655
PCT Pub. Date: Mar. 6, 2025

(65) Prior Publication Data
US 2025/0116326 A1    Apr. 10, 2025

(51) Int. Cl.
*F16H 57/029* (2012.01)
*F16H 1/16* (2006.01)
(Continued)

(52) U.S. Cl.
CPC ............ *F16H 57/029* (2013.01); *F16H 1/16* (2013.01); *F16H 57/031* (2013.01);
(Continued)

(58) Field of Classification Search
CPC ........ F16H 57/029; F16H 1/16; F16H 57/031; F16H 57/039; F16H 57/0472;
(Continued)

(56) References Cited

U.S. PATENT DOCUMENTS 3,582,094 A * 6/1971 Whittaker ................ F16J 15/56
277/584
3,716,245 A * 2/1973 Turolla .................. F16J 15/166
277/584
2002/0011127 A1   1/2002 Torii et al.

FOREIGN PATENT DOCUMENTS

DE          10137213 A1    3/2002
EP           1630461 A1    3/2006
(Continued)

OTHER PUBLICATIONS

International Search Report in PCT Application No. PCT/JP2023/030716 mailed Oct. 3, 2023, 5pp.
(Continued)

*Primary Examiner* — Thomas C Diaz
(74) *Attorney, Agent, or Firm* — HAUPTMAN HAM, LLP (57) ABSTRACT

A sliding surface sealing structure is a structure that seals a sliding surface between a rotating member that rotates about an axis and a sealing member that makes sliding contact with a circumferential surface of the rotating member, and includes: a wall surface configured to hold the sealing member between the wall surface and the circumferential surface of the rotating member; an opposing surface facing the sealing member with a gap therebetween; and a protruding portion protruding from the opposing surface toward the sealing member.

7 Claims, 5 Drawing Sheets

(51) Int. Cl.
*F16H 57/031* (2012.01)
*F16H 57/039* (2012.01)
*F16H 57/04* (2010.01)
*F16J 15/32* (2016.01)
*F16H 57/00* (2012.01)
*F16H 57/02* (2012.01)

(52) U.S. Cl.
CPC ....... *F16H 57/039* (2013.01); *F16H 57/0472* (2013.01); *F16J 15/32* (2013.01); *F16H 57/0006* (2013.01); *F16H 2057/02034* (2013.01); *F16H 2057/02082* (2013.01)

(58) Field of Classification Search
CPC ....... F16H 57/0006; F16H 2057/02034; F16H 2057/02082; F16J 15/32; F16J 15/3436; F16J 15/3472
USPC .......................................... 277/500, 584, 586
See application file for complete search history.

(56) References Cited

FOREIGN PATENT DOCUMENTS

| | | | |
|---|---|---|---|
| JP | H07-042845 A | 2/1995 | |
| JP | H0742845 A * | 2/1995 | ............... F16J 15/18 |
| JP | 2002156007 A | 5/2002 | |
| JP | 2006064111 A | 3/2006 | |
| JP | 2009180240 A | 8/2009 | |
| JP | 5563885 B2 | 7/2014 | |
| JP | 2017022801 A | 1/2017 | |
| JP | 2023092172 A | 7/2023 | |

OTHER PUBLICATIONS

Written Opinion in PCT Application No. PCT/JP2023/030716 mailed Oct. 3, 2023, 9pp.

* cited by examiner

SLIDING SURFACE SEALING STRUCTURE, GEAR BOX, AND MOTOR UNIT

RELATED APPLICATIONS

The present application is a National Phase of International Application No. PCT/JP2023/030716 filed Aug. 25, 2023.

TECHNICAL FIELD

The present invention relates to a structure that seals a sliding surface between a rotating member and a sealing member, a gear box including the structure, and a motor unit including the gear box.

BACKGROUND ART

A structure is conventionally known in which a sealing member such as an O-ring or a packing is brought into contact with a circumferential surface of a rotating member that rotates about an axis to block a gap between the rotating member and another member. For example, Patent Literatures 1 and 2 disclose a structure in which a sealing material (a sealing member) is brought into contact with a circumferential surface of a gear (a rotating member) to block a gap between the gear and a cover of a case (a gear case or gear box).

CITATION LIST

Patent Literature

Patent Literature 1: Japanese Patent No. 5563885
Patent Literature 2: JP 2023-92172 A

DISCLOSURE OF THE INVENTION

Problems to be Solved by the Invention

Incidentally, during rotation of the rotating member, the sealing member makes sliding contact with the circumferential surface of the rotating member, and thus a force acts on a sliding surface between the rotating member and the sealing member. Therefore, the sealing member may be displaced from a predetermined position. As a result, when the sealing member comes into contact with an inappropriate spot, it may cause abnormal noise, and abrasion and deterioration of the sealing member. Moreover, when the sealing member comes into contact with an inappropriate part of the rotating member, it may result in reductions in torque and rotation of the rotating member. Such problems can occur in, for example, a device or product including a rotating member and a sealing member regardless of whether or not it is a motor product such as in Patent Literatures 1 and 2 described above.

The present invention has been devised in view of such problems, and one of objects thereof is to prevent positional displacement of a sealing member. Note that objects of the present invention are not limited to this object, but also include another object of exerting operations and effects that can be derived from configurations presented in DESCRIPTION OF PREFERRED EMBODIMENTS described below, the operations and effects being unobtainable by the known technology.

Solutions to the Problems

The present invention can be realized as aspects (application examples) disclosed below, and solves at least a part of the above problems. Any of Aspect 2 and subsequent aspects is an aspect that can be additionally selected as appropriate, and is an aspect that can be omitted. Any of Aspect 2 and the subsequent aspects does not disclose an aspect and configuration that are essential to the present invention.

Aspect 1. A sliding surface sealing structure of the disclosure is a structure that seals a sliding surface between a rotating member that rotates about an axis and a sealing member that makes sliding contact with a circumferential surface of the rotating member, and includes: a wall surface configured to hold the sealing member between the wall surface and the circumferential surface of the rotating member: an opposing surface facing the sealing member with a gap therebetween; and a protruding portion protruding from the opposing surface toward the sealing member.

Aspect 2. In the above Aspect 1, it is preferable that the sealing member have an annular shape, and a plurality of the protruding portions be placed discontinuously along a circumferential direction of the sealing member.

Aspect 3. In the above Aspect 2, it is preferable that lubricating oil be applied to the sliding surface in advance, or the sealing member be impregnated with the lubricating oil in advance.

Aspect 4. In any of the above Aspects 1 to 3, it is preferable that the opposing surface face the sealing member from one side in an axial direction in which the axis extends, and the protruding portions have a shape having two rounded sides formed by two surfaces extending separately from each other from the opposing surface and a flat surface facing the sealing member as viewed from the axis.

Aspect 5. In any of the above Aspects 1 to 4, it is preferable that the opposing surface face the sealing member from the one side in the axial direction in which the axis extends, the rotating member include an end surface that is located between the opposing surface and the sealing member in the axial direction and forms a side with the circumferential surface, and the protruding portions protrude further than the end surface of the rotating member toward the sealing member.

Aspect 6. In any of the above Aspects 1 to 5, it is preferable that the opposing surface face the sealing member from the one side in the axial direction in which the axis extends, and the protruding portions have an inverted taper shape whose top surface facing the sealing member is inclined toward the opposing surface, progressively toward the wall surface.

Aspect 7. A gear box of the disclosure includes: the sliding surface sealing structure according to any of the above Aspects 1 to 6; a gear box body having a bottomed cylindrical housing portion that houses a gear as the rotating member; and a cover configured to seal the housing portion of the gear box body, in which the cover includes the wall surface, the opposing surface, and the protruding portions.

Aspect 8. A motor unit of the disclosure includes: the gear box according to the above Aspect 7: a helical gear as the gear: a worm integrated in the gear box and configured to mesh with the helical gear; and a motor mounted on the gear box and having a rotary shaft coupled to the worm.

Effects of the Invention

According to the present invention, the sealing structure is provided with the protruding portions protruding from the opposing surface toward the sealing member. Therefore, the position of the sealing member can be constrained by the protruding portions. Consequently, it is possible to prevent positional displacement of the sealing member due to sliding contact with the circumferential surface of the rotating member.

DESCRIPTION OF PREFERRED EMBODIMENTS

A sliding surface sealing structure, a gear box, and a motor unit as an embodiment are described with reference to the drawings. The embodiment presented below is a mere exemplification. There is no intention to preclude various modifications and application of a technology, which are not explicitly stated in the embodiments below. The configurations of the embodiment can be modified and carried out in various manners within the scope that does not depart from the purport of the configurations. Moreover, a selection can be made from the configurations as needed, or the configurations can be combined as appropriate.

The sliding surface sealing structure (hereinafter simply referred to as the "sealing structure") is a structure that seals a sliding surface between a rotating member that rotates about an axis and a sealing member that makes sliding contact with a circumferential surface of the rotating member. The sliding surface indicates both the circumferential surface of the rotating member and a surface of the sealing member that is in contact with the circumferential surface. When the rotating member is at rest, there is no "sliding" contact. However, these surfaces are called the sliding surface regardless of the actions (in operation and at rest) of the rotating member. Naturally, the expression "surface" in the sliding surface includes a shape (two-dimensional shape) generally recognized as a surface such as a flat surface or a curved surface, and there is no intention to exclude a three-dimensional shape having a part with, for example, a level difference or projections and depressions, or the part itself. In other words, the sliding surface may have a structure having, for example, a level difference or projections and depressions.

The sealing structure includes a wall surface that holds the sealing member between the wall surface and the circumferential surface of the rotating member, an opposing surface that faces the sealing member with a gap therebetween, and a protruding portion that protrudes from the opposing surface toward the sealing member.

In the embodiment, the sealing structure applied to a gear box that houses a gear as the rotating member is described as an example. Moreover, in the embodiment, a case is exemplified in which the gear as the rotating member is a helical gear of a speed reducer, and the gear box to which the sealing structure is applied houses the speed reducer in a motor unit obtained by unitizing the speed reducer and the motor.

[1. Configuration]
[1-1. Entire Configuration]

Figure 1:
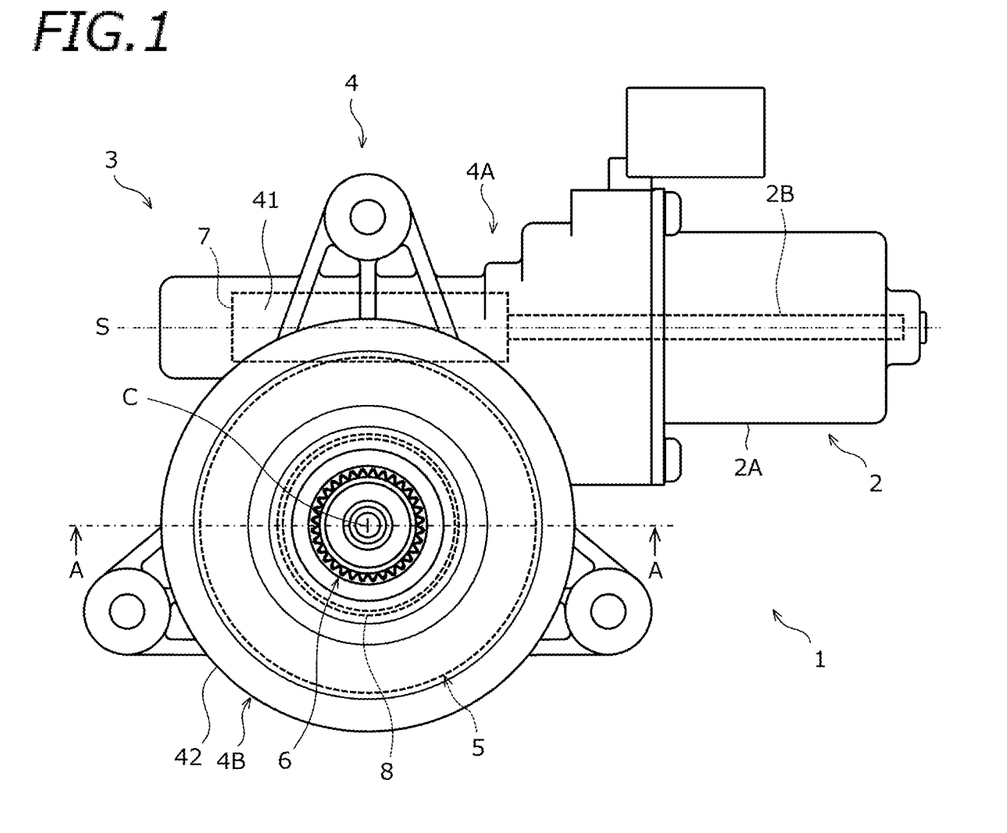
FIG. 1 is a plan view of a motor unit according to an embodiment.

FIG. 1 is a plan view of a motor unit 1 according to the embodiment (a diagram as viewed in an axial direction of an output gear 6 of a speed reducer 3). The motor unit 1 is used as a driving source of, for example, a closure device for a sliding door of a vehicle or a power window device. The motor unit 1 includes a motor 2 in which an unillustrated rotor and stator are integrated in a housing 2A, the speed reducer 3 that reduces the rotational speed of the motor 2, and a gear box 4 in which the speed reducer 3 is integrated. The motor 2 of the embodiment is, for example, a brushed DC motor, includes a rotary shaft 2B extending up to the gear box 4, and is mounted on the gear box 4 to be unitized with the speed reducer 3.

The speed reducer 3 includes a worm 7 coupled to the rotary shaft 2B of the motor 2, a helical gear 5 (a gear) as a rotating member that meshes with the worm 7, and the output gear 6 for transmitting output to the outside. The worm 7 is a gear that rotates integrally with the rotary shaft 2B of the motor 2. A rotation center S of the worm 7 coincides with a center line of the rotary shaft 2B of the motor 2. The worm 7 is integrated in the gear box 4.

Figure 2:
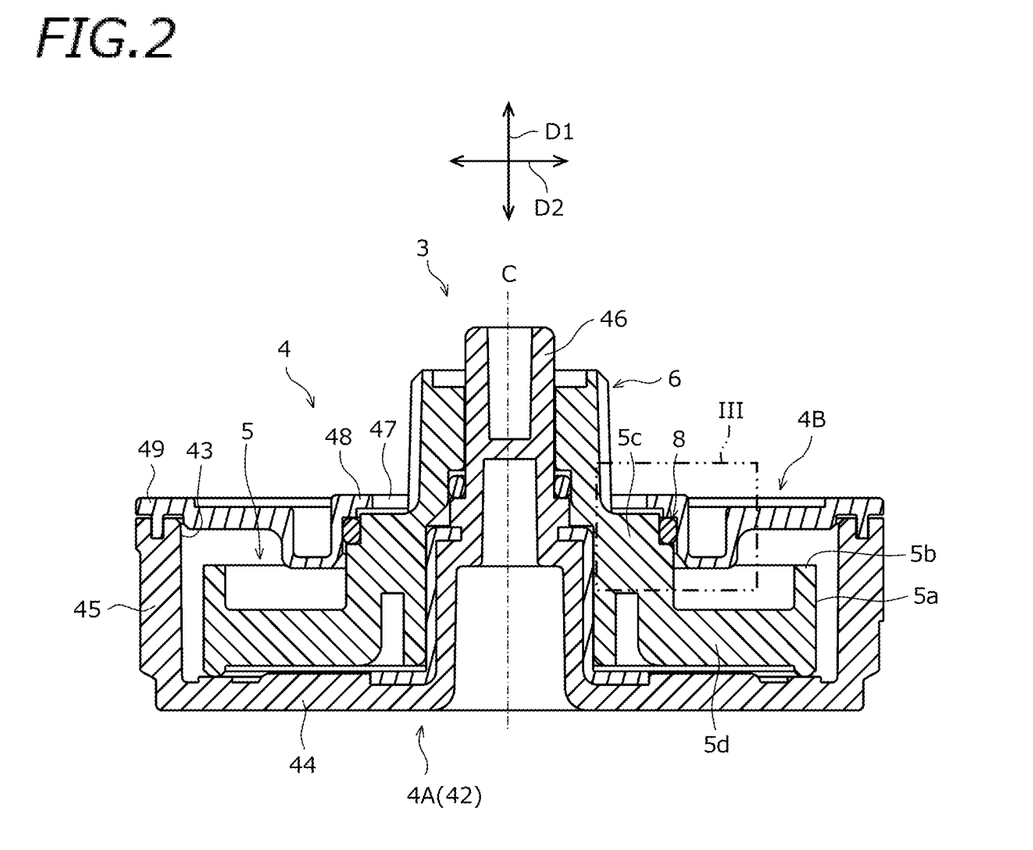
FIG. 2 is an axial cross-sectional view (a cross-sectional view on arrows A-A of FIG. 1) of a speed reducer and a gear box, which are included in the motor unit of FIG. 1.

The rotation of the motor 2 is transmitted to the helical gear 5 via the worm 7, and then the helical gear 5 rotates about an axis C orthogonal to the rotation center S of the worm 7. The helical gear 5 is, for example, a resin gear formed by injection molding. As illustrated in FIG. 2, the helical gear 5 includes an approximately annular rim 5b formed with external teeth 5a, an approximately annular hub 5c having a smaller diameter than the rim 5b, and a middle portion 5d connecting the rim 5b and the hub 5c. Both the rim 5b and the hub 5c are provided, centered on the axis C.

The output gear 6 is provided coaxially with the helical gear 5 (on the axis C), and rotates about the axis C integrally with the helical gear 5. In the embodiment, the helical gear 5 and the output gear 6, which are integrated together, are exemplified. However, the helical gear 5 and the output gear 6 may be provided separately from each other and fixed to each other in such a manner as to rotate integrally.

The helical gear 5 and the output gear 6 are aligned in an axial direction D1 in which the axis C extends. Dimensions in a radial direction D2 orthogonal to the axial direction D1 (the radial direction D2 of the helical gear 5 and the output gear 6) decrease gradually in the order of the rim 5b and the hub 5c of the helical gear 5, and the output gear 6. Therefore, the hub 5c of the helical gear 5 forms a stepped portion between the rim 5b and the output gear 6. The detailed structure of the stepped portion of the hub 5c is described below.

The gear box 4 is made of, for example, resin, and includes a gear box body 4A as a main body portion that houses, for example, the worm 7 and the helical gear 5, and a cover 4B as a lid portion mounted on the gear box body 4A. As illustrated in FIG. 1, the gear box body 4A includes a worm housing portion 41 that houses the worm 7 and a bottomed cylindrical helical gear housing portion 42 (a housing portion) that houses the helical gear 5. These two housing portions 41 and 42 communicate with each other in a spot where the worm 7 and the helical gear 5 mesh with each other. The worm housing portion 41 extends along the rotary shaft 2B and the rotation center S of the worm 7, and is formed with an opening (not illustrated) in a surface on which the motor 2 is mounted. The opening is closed by mounting the housing 2A of the motor 2.

As illustrated in FIG. 2, the helical gear housing portion 42 has a housing space surrounded by a bottom portion 44 expanding in the radial direction D2 around the axis C of the helical gear 5, and an approximately cylindrical wall portion 45 standing on an outer edge of the bottom portion 44. The helical gear housing portion 42 has an opening 43 surrounded by an end portion on an opposite side to the bottom portion 44 of the wall portion 45 (one side in the axial direction D1; hereinafter referred to as the "upper side," "above," or "upward"). The opening 43 has the same shape as the bottom portion 44, and here, a case in which the opening 43 has an approximately circular shape is exemplified. Moreover, the helical gear housing portion 42 has a support shaft 46 protruding in an approximately cylindrical form from a central portion of the bottom portion 44 along the axial direction D1. The support shaft 46 protrudes upward from the opening 43 and rotatably supports the helical gear 5 and the output gear 6.

The cover 4B is mounted in such a manner as to cover the opening 43 of the helical gear housing portion 42. The cover 4B is a fixed member that does not rotate and, therefore, is provided in such a manner as not to be in contact with the helical gear 5 and the output gear 6, which rotate. The cover 4B has an outer shape similar to the opening 43 of the helical gear housing portion 42, is one size larger than the opening 43, and has a size overlapping the wall portion 45 of the helical gear housing portion 42. In the embodiment, a case where the outer shape of the cover 4B is circular is exemplified. An outer peripheral portion 49 of the cover 4B is mounted on an end surface on the upper side of the wall portion 45 of the helical gear housing portion 42 via an unillustrated gasket. Consequently, the cover 4B seals the helical gear housing portion 42. Note that when the cover 4B is mounted on the helical gear housing portion 42 by ultrasonic welding, the gasket is not required.

The cover 4B has a circular output hole 47 penetrating a central portion of a surface portion that covers the opening 43. The output hole 47 is a through-hole for causing the support shaft 46 and the output gear 6 to protrude out of the gear box 4. In other words, the cover 4B of the embodiment does not completely cover the opening 43 of the helical gear housing portion 42, and can form a gap in a state where the support shaft 46 and the output gear 6 are inserted through the output hole 47. The cover 4B holds an O-ring 8 between the cover 4B and the helical gear 5, in an inner peripheral portion 48 surrounding the output hole 47. Note that the cover 4B of the embodiment has the surface portion that covers the opening 43 (a middle portion between the inner peripheral portion 48 and the outer peripheral portion 49), the surface portion not being flat, protruding toward the helical gear housing portion 42, and being recessed as viewed from the outside.

The O-ring 8 is a sealing member for sealing a gap between the helical gear 5 and the cover 4B (the inner peripheral portion 48). Even if a gap is formed in the above output hole 47, the O-ring 8 prevents entry of foreign matter into the helical gear housing portion 42. The O-ring 8 of the embodiment has an annular shape and is placed coaxially with the helical gear 5 (on the axis C). The O-ring 8 is formed of, for example, rubber and has elasticity. In the embodiment, the O-ring 8 that is circular in a cross section in the axial direction is exemplified. However, the cross-sectional shape of the O-ring 8 along the axial direction is not limited to a circular shape, and may be, for example, an elliptical shape or a polygonal shape.

[1-2. Configurations of Main Elements]

The sealing structure 10 applied to the gear box 4 is described in detail below with reference to FIGS. 3 to 5. In the following description, in the axial direction D1 of the helical gear 5, an opposite side (a side where the gear box body 4A is placed on the cover 4B) to the side where the cover 4B is placed on the gear box body 4A (the one side in the axial direction D1: the "upper side," "above," or "upward" described above) is referred to as the "lower side," "below," or "downward." In other words, the cover 4B is assumed to be placed above the gear box body 4A, and the gear box body 4A is assumed to be placed below the cover 4B. However, the up-and-down direction of the sealing structure 10 is not limited to the one exemplified herein. For example, the axial direction D1 may extend in the horizontal direction, or may extend in an oblique direction relative to the vertical direction.

Figure 3:
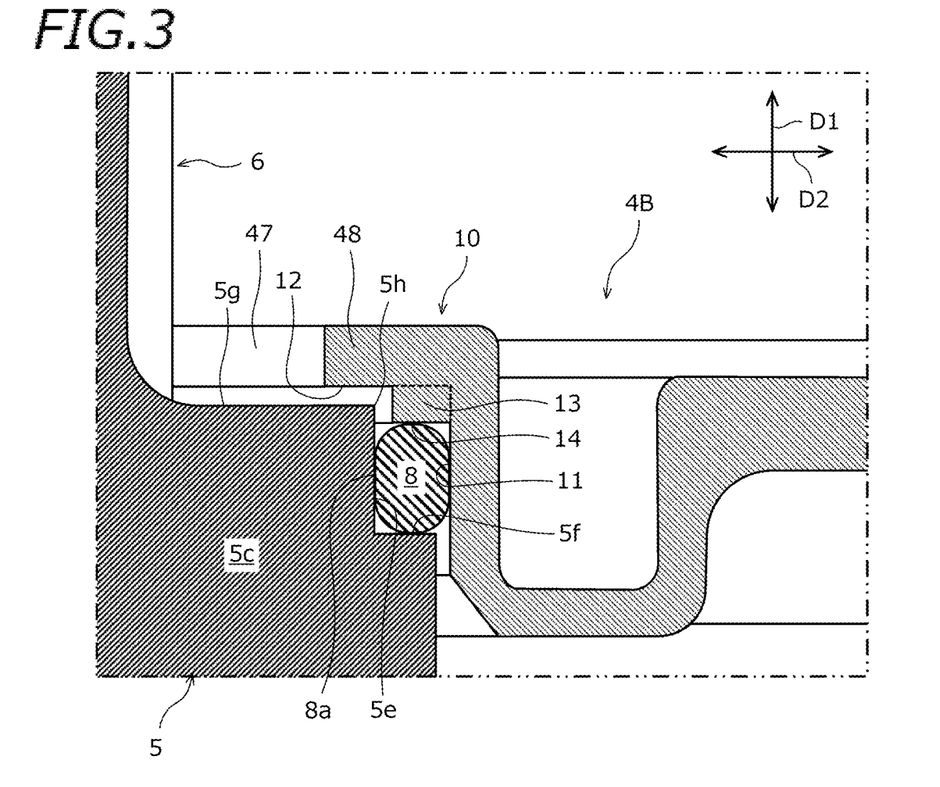
FIG. 3 is a cross-sectional view (an enlarged view of a part III of FIG. 2) for explaining a sliding surface sealing structure included in the gear box of FIG. 2.

As illustrated in FIG. 3, the hub 5c, which forms the stepped portion, of the helical gear 5 is provided with a groove portion for installing the O-ring 8. The groove portion includes a circumferential surface 5e extending in a circumferential direction around the axis C and a support surface 5f facing upward. In the embodiment, the cylindrical surface shaped circumferential surface 5e facing outward in the radial direction D2, and the planar support surface 5f extending along the circumferential direction around the axis C and along the radial direction D2 are exemplified.

Such a circumferential surface 5e and support surface 5f form an L shape that is open outward in the radial direction D2, in a cross section in the axial direction D1 including the axis C (the cross section illustrated in FIGS. 2 and 3). The circumferential surface 5e and the support surface 5f constrain a predetermined position where the O-ring 8 is placed. In other words, when the O-ring 8 is in contact with both the circumferential surface 5e and the support surface 5f, it can be said that the O-ring 8 is at the predetermined position (there is no positional displacement).

The helical gear 5 has an end surface 5g that is located above the support surface 5f (on the one side in the axial direction D1) and forms a side 5h (an angular edge) with the circumferential surface 5e. As in the support surface 5f, the end surface 5g has a planar shape that faces upward and extends along the circumferential direction and along the radial direction D2. The end surface 5g corresponds to an end portion on the upper side of the helical gear 5 and is smoothly connected to the output gear 6. The end surface 5g is placed below the inner peripheral portion 48 of the cover 4B. Note that the circumferential surface 5e is not limited to a cylindrical surface shape. Moreover, the support surface 5f and the end surface 5g may each have a planar shape inclined relative to the radial direction D2, or may have a gently curved shape.

The gear box 4 includes the sealing structure 10 that seals the sliding surface between the helical gear 5 and the O-ring 8. The sliding surface referred to here indicates surfaces where the helical gear 5 and the O-ring 8 make sliding contact, and indicates both the circumferential surface 5e of the helical gear 5 and an inner peripheral surface 8a of the O-ring 8. Grease (lubricating oil) is applied to the sliding surface in advance. Specifically, the O-ring 8 is assembled to the helical gear 5 with the grease applied to at least one of the circumferential surface 5e of the helical gear 5 and the inner peripheral surface 8a of the O-ring 8. Therefore, the sliding surface is in a state of being coated with the grease, and the cover 4B is mounted in this state. Note that instead of the configuration in which grease is applied to the sliding surface in advance as described above, the O-ring 8 may be impregnated with grease (lubricating oil) in advance.

The sealing structure 10 includes a wall surface 11 that holds the O-ring 8 between the wall surface 11 and the circumferential surface 5e of the helical gear 5, an opposing surface 12 that faces the O-ring 8 from above (the one side in the axial direction D1), and protruding portions 13 that protrude from the opposing surface 12 toward the O-ring 8. In the embodiment, the cover 4B has the wall surface 11, the opposing surface 12, and the protruding portions 13. Put another way, all of the elements 11 to 13 of the sealing structure 10 are provided on the cover 4B, which is a single component.

The wall surface 11 extends in the circumferential direction around the axis C in such a manner as to face the circumferential surface 5e of the helical gear 5 in the radial direction D2. The wall surface 11 of the embodiment is a smooth curved surface (a cylindrical inner peripheral surface) that faces inward in the radial direction D2 and extends in the circumferential direction around the axis C, and is placed outward of the circumferential surface 5e of the helical gear 5 in the radial direction D2. The wall surface 11 holds the O-ring 8 from the outer and inner sides in the radial direction D2 in cooperation with the circumferential surface 5e of the helical gear 5. While being held by the wall surface 11 and the circumferential surface 5e in this manner, the elastic O-ring 8 deforms in the axial direction D1 accompanied by being compressed in the radial direction D2.

The opposing surface 12 is a surface facing downward (toward the other side in the axial direction D1), and is placed with a gap between the opposing surface 12 and the O-ring 8. The gap between the opposing surface 12 and the O-ring 8 is originally a space for appropriately letting the O-ring 8 escape without any problems even when the O-ring 8 is deformed in the axial direction D1, and is also a space that tolerates variations in the dimension of each component in the axial direction D1. In the embodiment, the gap between the opposing surface 12 and the O-ring 8 also functions as a space for collecting the grease (a grease reservoir). The opposing surface 12 of the embodiment has a planar shape extending along at least the radial direction D2 in the inner peripheral portion 48 of the cover 4B.

On the other hand, each of the protruding portions 13 is a part partially protruding downward from the opposing surface 12, and is formed in such a manner as to be slightly in contact with the O-ring 8 or to have a minute gap between the protruding portion 13 and the O-ring 8. The protruding portions 13 have a function of preventing the O-ring 8 from being displaced upward (lifting) from the predetermined position. The protruding portions 13 protrude downward (toward the O-ring 8) of the end surface 5g of the helical gear 5 in the axial direction D1. In other words, a top surface 14, which faces the O-ring 8, of the each of the protruding portions 13 is located below the end surface 5g of the helical gear 5. In cooperation with the support surface 5f of the helical gear 5, the top surfaces 14 may sandwich the O-ring 8 from above and below in the axial direction D1, or be placed in such a manner as to sandwich the O-ring 8 in a non-contact state.

In a cross section in the axial direction D1 including the axis C (the cross section illustrated in FIGS. 2 and 3), the wall surface 11 and each of the top surfaces 14 form an L shape that is open inward in the radial direction D2. Moreover, as indicated by broken lines in FIG. 3, in a similar cross section in a spot without the protruding portions 13 (between the protruding portions 13 adjacent to each other), the wall surface 11 and the opposing surface 12 also similarly form an L shape that is open inward in the radial direction D2. However, the dimension of the L shape in the axial direction D1 is shorter by the amount of protrusion of the protruding portions 13 at positions where the protruding portions 13 are present.

Figure 4:
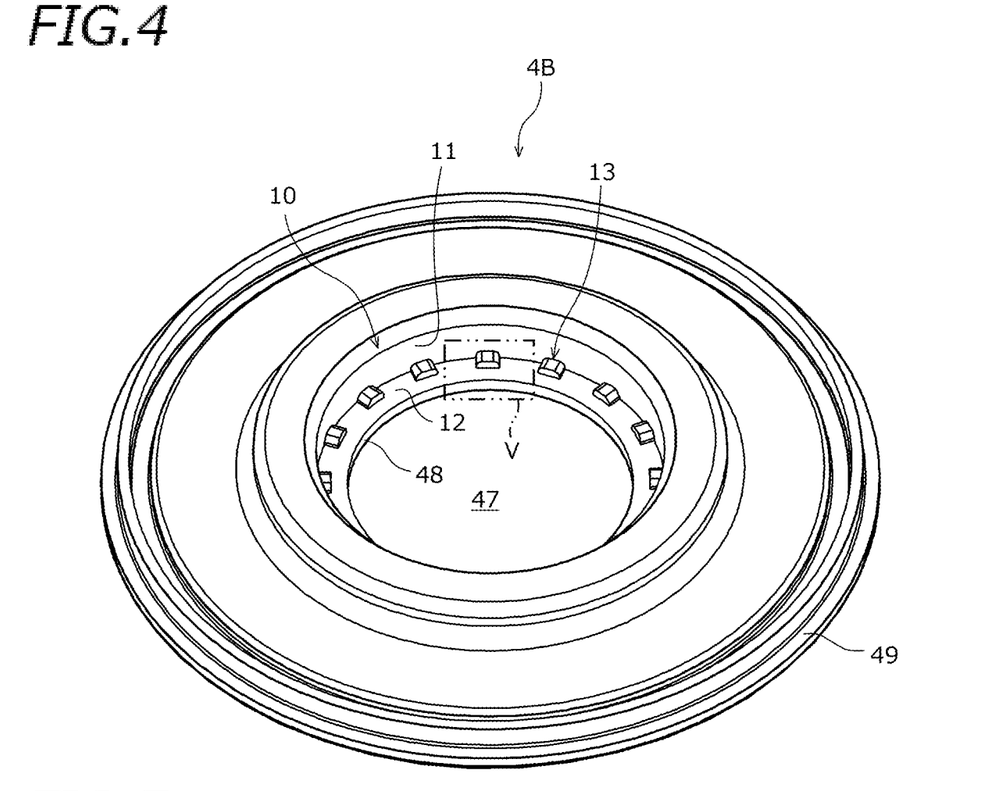
FIG. 4 is a perspective view of a cover included in the gear box of FIG. 2 as viewed from the inside (the lower side in FIG. 2).

FIG. 4 is a perspective view of the cover 4B as viewed from below (the side where the helical gear 5 is placed). In the embodiment, a plurality of (for example, 16) the protruding portions 13 is placed discontinuously along a circumferential direction of the O-ring 8 as illustrated in FIG. 4. Although the reference sign is assigned to one protruding portion 13 in FIG. 4, for example, all of the plurality of the protruding portions 13 is configured similarly, and is spaced at even intervals along the circumferential direction of the O-ring 8. The intervals between adjacent protruding portions 13 in the circumferential direction of the O-ring 8 are ensured to be larger than the dimension of one protruding portion 13 (a dimension corresponding to a distance between end side surfaces 15 and 15 described below).

Figure 5:
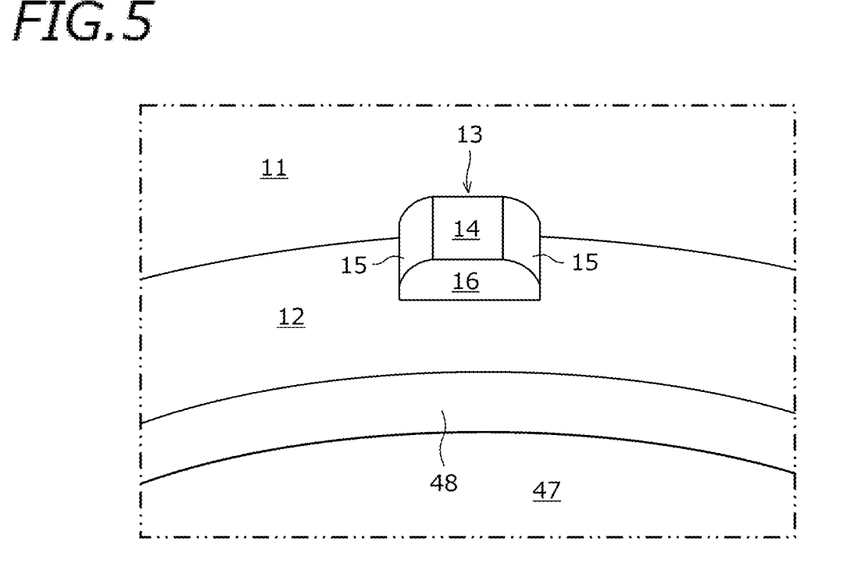
FIG. 5 is an enlarged view (an enlarged view of a part V of FIG. 4) of a protruding portion included in the cover of FIG. 4.

As illustrated in FIG. 5, the protruding portion 13 of the embodiment is connected to the wall surface 11 and has three side surfaces 15, 15, and 16 extending from the opposing surface 12 and the top surface 14 connecting these side surfaces 15, 15, and 16. The three side surfaces 15, 15, and 16 are divided into two end side surfaces 15 and 15 (two surfaces) separate from each other, and an inner side surface 16 connecting the end side surfaces 15 and 15 on the inner side in the radial direction D2. Each of the end side surfaces 15 and 15 extends along the axial direction D1 and the radial direction D2. On the contrary, the inner side surface 16 extends along the axial direction D1 and the circumferential direction, and forms sides (angular edges) with each of the end side surfaces 15.

On the other hand, the top surface 14 is a flat surface extending inward in the radial direction D2 from the wall surface 11, and forms a side (an angular edge) with the inner side surface 16, but is connected by smooth curved surfaces to the end side surfaces 15 and 15. Therefore, as viewed from the axis C, the protruding portion 13 has a shape in which two sides formed by the end side surfaces 15 and 15 and the top surface 14 (the flat surface) are rounded (so to speak, a semi-cylindrical shape). Note that the protruding portion 13 may be separate from the wall surface 11 (spaced away from the wall surface 11). In this case, an outer side surface paired with the inner side surface 16 is placed, facing the wall surface 11.

[2. Operations and Effects]

(1) According to the above sealing structure 10, the protruding portions 13 are provided, protruding from the opposing surface 12 toward the O-ring 8 as the sealing member. Therefore, the position of the O-ring 8 can be constrained by the protruding portions 13. Consequently, it is possible to prevent the O-ring 8 from being displaced (lifting toward the opposing surface 12) due to sliding contact with the circumferential surface 5e of the helical gear 5 as the rotating member. Therefore, it is possible to prevent the generation of abnormal noise due to the contact of the O-ring 8 with an inappropriate part (for example, the side 5h formed by the circumferential surface 5e and the end surface 5g of the helical gear 5), and it is possible to enhance the wear resistance and durability of the O-ring 8. Moreover, the contact of the O-ring 8 with an inappropriate spot of the rotating helical gear 5 is prevented. Therefore, reductions in torque and rotation of the helical gear 5 can be prevented.

Incidentally, it is also conceivable to provide the helical gear 5 with some structure for preventing the positional displacement of the O-ring 8 instead of the structure in which the protruding portions 13 are provided, protruding from the opposing surface 12 of a member (the cover 4B in the embodiment) different from the helical gear 5 as in the above embodiment. However, in this case, additional machining is required for the helical gear 5. Therefore, there arises a problem that the manufacturing of the helical gear 5 becomes complicated.

On the contrary, according to the above sealing structure 10, the protruding portions 13 are formed on the cover 4B, which is the component different from the helical gear 5, to prevent the positional displacement of the O-ring 8. Therefore, it is not necessary to perform additional machining on the helical gear 5. Hence, it is possible to avoid complication of the manufacturing of the helical gear 5.

(2) When the plurality of the protruding portions 13 is placed discontinuously along the circumferential direction of the annular O-ring 8, the position of the O-ring 8 can be constrained at a plurality of spots in the circumferential direction of the O-ring 8. Hence, the positional displacement of the annular O-ring 8 can be prevented more stably. Moreover, when the protruding portions 13 are placed discontinuously along the circumferential direction, deformation (sink marks) at the time of molding can be prevented as compared with a case in which the protruding portion 13 is formed along the total circumference in the circumferential direction, which results in an increase in thickness. Consequently, the dimensional accuracy of the protruding portions 13 is enhanced, and thus the reliability of the sealing structure 10 can be enhanced.

(3) When the grease is applied to the sliding surface in advance, or when the O-ring 8 is impregnated with the grease in advance, the spaces between the protruding portions 13 placed discontinuously (the gap between the opposing surface 12 and the O-ring 8) function as the grease reservoirs. Therefore, the grease can be collected in between the protruding portions 13. Consequently, in addition to that the positional displacement of the O-ring 8 can be prevented by the protruding portions 13, the lubricity of the sliding surface can be enhanced. In particular, when the intervals between adjacent protruding portions 13 are ensured to be larger than the dimension of one protruding portion 13 in the circumferential direction of the O-ring 8, the spaces between the protruding portions 13 can be caused to function excellently as the grease reservoirs.

Moreover, when the O-ring 8 is displaced in the circumferential direction due to sliding contact with the helical gear 5, parts in the vicinity of the protruding portions 13 and parts away from the protruding portions 13 are alternately repeated along the circumferential direction on the O-ring 8. Hence, the pump effect (changes in the gaps in the circumferential direction) can cause the grease collected in between the protruding portions 13 to flow in the circumferential direction. This also enhances the lubricity of the sliding surface. Therefore, reductions in torque and rotation of the helical gear 5 can be suppressed. Moreover, when the elastic O-ring 8 comes into contact with the protruding portions 13 and is deformed, parts deformed by the protruding portions 13 and undeformed parts that do not come into contact with the protruding portions 13 are alternately repeated along the circumferential direction on the O-ring 8. Hence, with a stronger pump effect, it is possible to cause the grease collected in between the protruding portions 13 to flow in the circumferential direction. This also further enhances the lubricity of the sliding surface. Therefore, reductions in torque and rotation of the helical gear 5 can be suppressed further.

(4) The protruding portions 13 each having the shape with the two rounded sides formed by the end side surfaces 15 and 15 extending separately from each other from the opposing surface 12 and the top surface 14 facing the O-ring 8 as viewed from the axis C can prevent stress concentration when coming into contact with the O-ring 8. In particular, when the O-ring 8 moves in the circumferential direction due to sliding contact with the helical gear 5, stress concentration from the protruding portions 13 to the O-ring 8 can be effectively prevented. Therefore, it contributes to prevention of breakage of the O-ring 8. Moreover, the top surfaces 14, which are the flat surfaces, come into contact with the O-ring 8. Therefore, it is possible to appropriately constrain the position of the O-ring 8 while preventing stress concentration on the O-ring 8. Hence, it is possible to prevent the positional displacement of the O-ring 8 while preventing the breakage of the O-ring 8.

(5) When the protruding portions 13 protrude further than the end surface 5g of the helical gear 5 toward the O-ring 8, the position of the O-ring 8 is constrained by the protruding portions 13. Therefore, it is possible to prevent the O-ring 8 from coming into contact with the side 5h of the helical gear 5 and from being caught in a gap between the opposing surface 12 and the side 5h of the helical gear 5. Hence, it is possible to prevent the generation of abnormal noise due to the contact of the side 5h of the helical gear 5 and the O-ring 8, and it is possible to cause the O-ring 8 to appropriately exert the sealing effect (sealing property).

(6) The above-mentioned gear box 4 includes the above sealing structure 10, the gear box body 4A for housing the helical gear 5, and the cover 4B that seals the helical gear housing portion 42. When the gear box 4 includes the cover 4B having the wall surface 11, the opposing surface 12, and the protruding portions 13, all the elements of the sealing structure 10 are provided to the cover 4B, which is a single component. Hence, it is possible to use existing products for the helical gear 5 and the gear box body 4A, and it is possible to prevent the positional displacement of the O-ring 8 as described above while preventing an increase in cost with few changes.

(7) According to the motor unit 1 including the above gear box 4, the sealing structure 10 is applied to the gear box 4. Therefore, the positional displacement of the O-ring 8 is prevented with few changes as described above, which allows the O-ring 8 to appropriately exert the sealing effect. Hence, it is possible to enhance reliability by securing the sealing property of the cover 4B while preventing an increase in cost.

[3. Others]

The above protruding portions 13 are an example. The sealing structure 10 may include a protruding portion 13' illustrated in FIG. 6 instead of the above protruding portion 13. The protruding portion 13' according to the modification has an inverted taper shape whose top surface 14' facing the O-ring 8 is inclined toward the opposing surface 12 (upward in the example of FIG. 6), progressively toward the wall surface 11. Put another way, the amount of protrusion of the protruding portion 13' is largest on the circumferential surface 5e side and is reduced progressively toward the wall surface 11. In this manner, the top surface 14' of the modification is formed in a planar shape inclined relative to the radial direction D2 in such a manner as to constrain the O-ring 8 on the wall surface 11 side. Note that, in FIG. 6, the same reference signs are assigned to the same or corresponding elements as or to those in the above embodiment, and redundant descriptions are omitted here.

Figure 6:
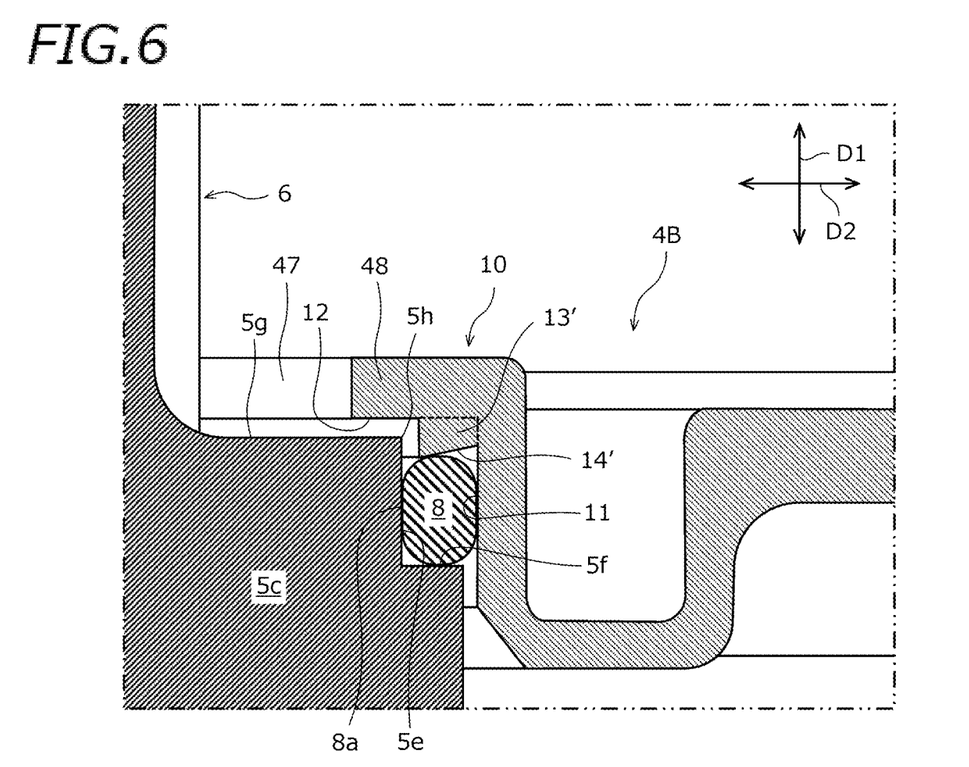
FIG. 6 is a cross-sectional view (a diagram corresponding to FIG. 3) for explaining a sliding surface sealing structure according to a modification.

The inverted tapered top surface 14' of the protruding portion 13' according to the modification causes a force toward the wall surface 11 to act on the O-ring 8 when the protruding portion 13' comes into contact with the O-ring 8. Hence, it is possible to more effectively prevent the O-ring 8 from coming into contact with an inappropriate part (for example, the side 5h) other than the circumferential surface 5e of the helical gear 5. Hence, it is possible to more reliably prevent the generation of abnormal noise and reductions in torque and rotation of the helical gear 5 such as described above, and it is possible to more effectively enhance the wear resistance and durability of the O-ring 8.

The above planar top surfaces 14 and 14' are examples. For example, the top surfaces 14, 14' may each be formed in a curved shape (a semicircular shape as viewed from the axis C) by smoothly extending the curved surfaces forming the rounded sides between the top surface 14, 14' and the end side surfaces 15 and 15. Moreover, the protruding portions 13, 13' may each have a rectangular parallelepiped shape having sides between the end side surfaces 15 and 15 and the top surface 14, 14', or may have a trapezoidal shape as viewed from the axis C. Furthermore, the protruding portions 13, 13' may not be spaced at even intervals along the circumferential direction, or only one protruding portion may be provided, protruding from the opposing surface 12. In any case, the protruding portion or portions 13 are provided, protruding from the opposing surface 12 facing the O-ring 8 toward the O-ring 8. Therefore, the positional displacement of the O-ring 8 can be prevented as described above.

The wall surface 11 and the opposing surface 12 are not limited to the above configurations, either. For example, the wall surface 11 may be inclined relative to the axial direction D1. Moreover, the opposing surface 12 is not limited to the one facing the O-ring 8 from the one side in the axial direction D1 (the upper side in FIGS. 2 and 3), may face the O-ring 8 from the other side in the axial direction (the lower side in FIGS. 2 and 3), and may be slightly inclined relative to the radial direction D2, or may be a curved surface. Moreover, the opposing surface 12 may face the O-ring 8 in the radial direction D2 depending on the shape and positional relationship of the wall surface 11. The opposing surface 12 is at least a surface different from the wall surface 11, the surface facing the sealing member (for example, the O-ring 8) with a gap therebetween.

The rotating member and the sealing member, which are applied to the above sealing structure 10, are not limited to the above helical gear 5 and O-ring 8, respectively. The rotating member is simply required to rotate about an axis, and may be, for example, a spur gear (spur gear), or a member other than a gear. Moreover, the sealing member is simply required to make sliding contact with the circumferential surface of the rotating member, and may not be annular, and may not have elasticity.

In the above embodiment, the example has been presented in which the elements 11 to 13 of the sealing structure 10 are provided to the cover 4B, which is a single component. However, the elements 11 to 13 of the sealing structure 10 may be provided separately to two or more different types of components. For example, instead of the protruding portions 13 provided integrally with the opposing surface 12 as described above, a protruding portion (a separate component) separate from the opposing surface 12 may be prepared, and the protruding portion may be attached (fixed) to the opposing surface 12 to be provided, protruding from the opposing surface 12. Note that the materials of the helical gear 5 and the gear box 4 are not particularly limited, and the helical gear 5 and the gear box 4 may not be made of resin as described above.

In the above embodiment, the sealing structure 10 applied to the gear box 4 of the speed reducer 3 included in the motor unit 1 has been described. However, the above sealing structure 10 may be applied to a gear box of the separate speed reducer 3 that is not unitized with the motor 2, or may be applied to a gear box of a device other than the speed reducer 3. The sealing structure can be applied to various structures (apparatuses and devices) that seal between a rotating member and a non-rotating member by use of a sealing member, and may be applied to, for example, household appliances.

DESCRIPTION OF REFERENCE SIGNS

1 Motor unit
2 Motor
2B Rotary shaft
3 Speed reducer
4 Gear box
4A Gear box body
4B Cover
5 Helical gear (gear, rotating member)
5e Circumferential surface
5g End surface
7 Worm
8 O-ring
10 Sealing structure
11 Wall surface
12 Opposing surface
13 Protruding portion
14 Top surface
15 End side surface (two surfaces)
42 Helical gear housing portion (housing portion)
C Axis of helical gear
D1 Axial direction

The invention claimed is:

1. A sliding surface sealing structure that seals a sliding surface between a rotating member that rotates about an axis and a sealing member that makes sliding contact with a circumferential surface of the rotating member, the structure comprising:
a wall surface configured to hold the sealing member between the wall surface and the circumferential surface of the rotating member;
an opposing surface facing the sealing member with a gap therebetween; and
a protruding portion protruding from the opposing surface toward the sealing member, wherein
the opposing surface faces the sealing member from one side in an axial direction in which the axis extends, and
the protruding portion has a shape having two rounded sides formed by two surfaces extending separately from each other from the opposing surface and a flat surface facing the sealing member as viewed from the axis.

2. The sliding surface sealing structure according to claim 1, wherein
the sealing member has an annular shape, and
a plurality of the protruding portions is placed discontinuously along a circumferential direction of the sealing member.

3. The sliding surface sealing structure according to claim 2, wherein lubricating oil is applied to the sliding surface in advance, or the sealing member is impregnated with the lubricating oil in advance.

4. The sliding surface sealing structure according to claim 1, wherein
the opposing surface faces the sealing member from one side in the axial direction in which the axis extends,
the rotating member includes an end surface that is located between the opposing surface and the sealing member in the axial direction and forms a side with the circumferential surface, and
the protruding portion protrudes further than the end surface of the rotating member toward the sealing member.

5. The sliding surface sealing structure according to claim 1, wherein
the opposing surface faces the sealing member from one side in the axial direction in which the axis extends, and
the protruding portion has an inverted taper shape whose top surface facing the sealing member is inclined toward the opposing surface, progressively toward the wall surface.

6. A gear box comprising:
the sliding surface sealing structure according to claim 1;
a gear box body including a bottomed cylindrical housing portion that houses a gear as the rotating member; and
a cover configured to seal the housing portion of the gear box body, wherein
the cover includes the wall surface, the opposing surface, and the protruding portions.

7. A motor unit comprising:
the gear box according to claim 6;
a helical gear as the gear;
a worm integrated in the gear box and configured to mesh with the helical gear; and
a motor mounted on the gear box and including a rotary shaft coupled to the worm.

* * * * *